US007333553B2

(12) United States Patent
Chandrasekhar et al.

(10) Patent No.: US 7,333,553 B2
(45) Date of Patent: Feb. 19, 2008

(54) TUNABLE DUOBINARY TRANSMITTER

(75) Inventors: Sethumadhavan Chandrasekhar, Matawan, NJ (US); Peter Winzer, Tinton Falls, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 673 days.

(21) Appl. No.: 10/855,449

(22) Filed: May 27, 2004

(65) Prior Publication Data

US 2005/0265474 A1    Dec. 1, 2005

(51) Int. Cl.
    *H04L 25/34*    (2006.01)
(52) U.S. Cl. ..................................... 375/291
(58) Field of Classification Search .............. 375/264, 375/286, 290–291, 295, 288
    See application file for complete search history.

(56) References Cited

U.S. PATENT DOCUMENTS

| 3,457,510 | A |   | 7/1969 | Lender ..................... 325/38 |
| 4,618,941 | A | * | 10/1986 | Linder et al. ............... 708/319 |
| 5,408,500 | A | * | 4/1995 | Ginzburg et al. ........... 375/288 |
| 2002/0054409 | A1 | * | 5/2002 | Bartur et al. ............... 359/152 |
| 2003/0063677 | A1 | * | 4/2003 | Mix et al. .................. 375/259 |

OTHER PUBLICATIONS

"10 GB/S Duobinary Receiver With A Record Sensitivity Of 88 Photons Per Bit ," authored by Lothar Moeller, Chongjin Xie, Roland Ryf, Xiang Liu, Xing Wei, Proc. OFC'04, Paper PDP30, 2004.

"Spectrum Of Externally Modulated Optical Signals," authored by Keang-Po Ho, Member IEEE and Joseph M. Kahn, Fellow, IEEE—published in Journal Of Lightwave Technology at pp. 1-6 (Manuscript written on Mar. 20, 2003).

"Effect Of Electrical Filtering Of Duobinary Signals On The Chromatic Dispersion Transmission Limitations," authored by D. Penninckx and published in ECOC'98, Sep. 20-24, 1998, Madrid Spain.

"Characteristics Of Optical Duobinary Signals In Terabit/s Capacity, High-Spectral Efficiency WDM Systems," authored by Takashi Ono, Yutaka Yano, Kiyoshi Fukuchi, Toshiharu Ito, Hiroyuki Yamazaki, Masayuki Yamaguchi, and Katsumi Emura in Journal Of Lightwave Technology, vol. 16, No. 5, May 1998 at pp. 788-797.

"Duobinary Transmitter With Low Intersymbol Interference," authored by T. Franck, P.B. Hansen, Member, IEEE, T.N. Nielsen and L. Eskildsen, Member, IEEE published in IEEE Photonics Technology Letters, vol. 10, No. 4, Apr. 1998 at pp. 597-599.

"The Duobinary Technique For High-Speed Data Transmission," authored by Adam Lender, Member IEEE, published in IEEE Trans. Commun. Electron, vol. 82, May 1963 at pp. 214-218.

\* cited by examiner

*Primary Examiner*—Khanh C. Tran

(57) ABSTRACT

An apparatus and method for tunably delaying a signal and using that delayed signal in a duobinary transmitter is described. The transmitted duobinary signal is representative of the binary signal, and is formed by, among other things, introducing into a copy of the binary signal a delay that may be adjusted to be greater than or less than the bit period of the signal. Once the binary signal has been converted into a duobinary signal, it may then be converted into an optical duobinary signal. Alternatively, the conversion from binary to duobinary in accordance with the invention may be performed in the optical domain.

21 Claims, 9 Drawing Sheets

Fig. 7A
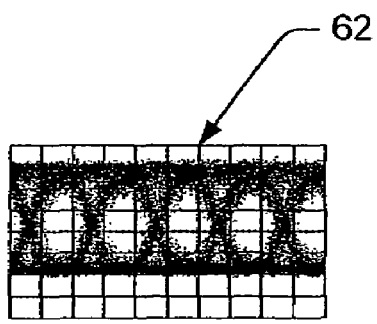
Fig. 7B
Fig. 7C
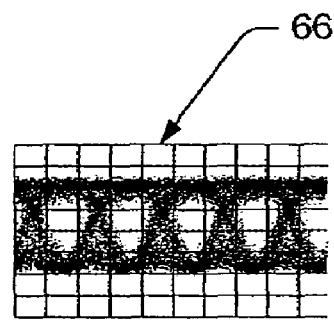
Fig. 7

TUNABLE DUOBINARY TRANSMITTER

TECHNICAL FIELD

The present invention relates to the generation of duobinary bit streams, and particularly to the transmission of voice and data signals in duobinary form.

BACKGROUND

Voice and data generally is transmitted between communications devices as either electrical signals through electrical waveguides, free space, or as optical signals through optical fiber.

One way to provide optical transmitters with greater transmission range and/or with greater robustness to band-limited channels is to encode the data into the signal using a well-known method called duobinary encoding [A. Lender, *The Duobinary Technique for High-Speed Data Transmission*, IEEE Trans. Commun. Electron. 82, 214-218, 1963]. A signal having duobinary encoded data typically has 2-3 times better dispersion tolerance than an equivalent signal in which the data is coded as conventional binary. However, there is a price to pay. Duobinary signals perform worse than conventional binary signals when the dispersion is very low, such as when the data is transmitted over a short transmission distance or the transmission medium is extremely well dispersion-compensated. This is not only a problem for well-compensated systems, but also in connection with testing and verification of network components since testing and verification usually involves placing the network components in a back-to-back mode, involving short transmission distances. An ideal broadband optical or electrical data transmitter would have good transmission characteristics for both long transmission distances and in back-to-back operation, i.e., short or well-compensated transmission situations.

SUMMARY

The present invention is an apparatus and method for matching a transmission characteristic of a duobinary signal to a transmission requirement of a communications network or other transmission situation. In a preferred embodiment of the invention, a copy of a binary signal is delayed by an amount of time that is a non-integer multiple of the signal bit period of the binary signal. The duobinary signal is then produced by combining the delayed copy of the binary signal with the binary signal.

By selecting the delay to be appropriately longer than one bit period of the signal, a duobinary signal having improved back-to-back performance characteristics is produced. Such a signal is useful in networks having relatively short transmission distances, and over transmission media that are well dispersion-compensated.

Conversely, by selecting the delay to be appropriately shorter than one bit period of the binary signal, a duobinary signal having improved dispersion performance characteristics is produced. A signal with these characteristics is preferred for situations in which the signal is transmitted over long distances.

In one embodiment of the invention, the duobinary signal is produced as an electrical signal, which may then be converted into an optical signal.

In an alternative embodiment of the invention, both the delaying of a copy of the signal and the production of a duobinary signal are performed in the optical domain.

Furthermore, the invention is not only applicable in connection with optical transmission media, but can be applied to duobinary signals that remain electrical at all times.

Empirically, a delay of between approximately 1.01 and 1.5 times the bit period of the binary signal has been found to be effective in providing a duobinary signal with improved back-to-back performance, and a delay that is between approximately 0.5 and 0.99 times the bit period of the binary signal has been found to be effective in providing improved dispersion performance.

In a further embodiment of the invention, the non-integer delay of a broad band digital system is effectively provided by phase shifting a narrow band clocking signal and then applying the narrow band clocking signal to a digital latching circuit.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

FIG. 7a is an "Eye Diagram" oscilloscope display of a signal that has been Duobinary encoded in accordance with the present invention by Delay and Add processing and in which the delay is greater than one bit duration of the signal.

FIG. 7b is an "Eye Diagram" oscilloscope display of a signal that has been Duobinary encoded in accordance with the present invention by Delay and Add processing in which the delay is equal to one bit duration of the signal.

FIG. 7c is an "Eye Diagram" oscilloscope display of a signal that has been Duobinary encoded in accordance with the present invention and in which the delay is less than one bit duration of the signal.

DETAILED DESCRIPTION

Figure 1:
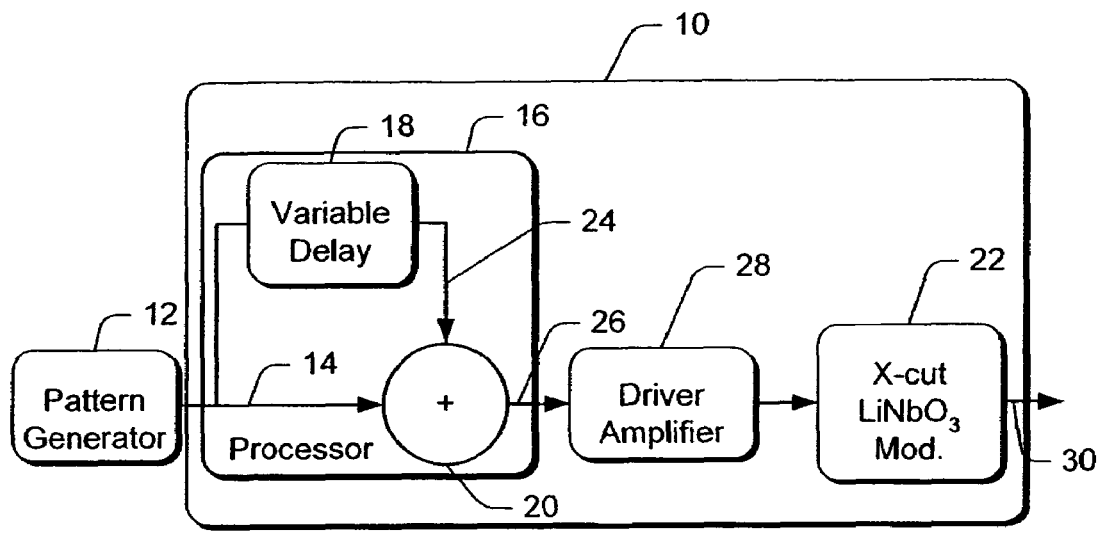
FIG. 1 is a schematic drawing of an apparatus for producing an optical duobinary signal, in accordance with the present invention.

During the course of this description, like numbers will be used to identify like elements according to the different views that illustrate the invention.

Duobinary signal transmission is a well-known method of decreasing the bandwidth of the signal for a given, band-limited channel (thus increasing the amount of data that can be transmitted in a given channel) by utilizing three states or levels to represent binary data. It is particularly useful in optical communications systems as a way of overcoming the chromatic dispersion limits to maximum transmission distance in a fiber and is therefore frequently used when high tolerance to residual chromatic dispersion at the receiver is important. Typically, the dispersion tolerance of duobinary signals is 2-3 times that of standard Non Return-to-Zero (NRZ) or optical binary coding transmission.

There are at least two well-known, standard ways to generate duobinary signals. The first method [T. Ono et al., *Characteristics of Optical Duobinary Signals in terabit/s Capacity High-Spectral Efficiency WDM Systems*, J. Lightwave Technol. 16, 788-797, 1998] uses an electrical low pass (LP) filter having a low pass band limit of about a quarter of the signal data rate. Applying such a filter to a precoded binary bit sequence generates a 3-level duobinary electrical signal. This electrical duobinary signal may then be mapped onto an optical carrier using a suitable electrical-to-optical converter, such as a Mach-Zehnder modulator.

A second well-known method of generating duobinary signals [T. Franck et al., *Duobinary Transmitter with Low Intersymbol Interference*, Photon. Technol. Lett. 10, 597-599, 1998] is the "delay-and-add" (D&A) duobinary method. In this method, electronic circuitry is used to add a 1-bit delayed version of the pre-coded binary bit stream to an un-delayed copy of the binary bit stream, creating an electrical 3-level duobinary signal. This D&A duobinary electrical signal is then mapped onto an optical carrier using a suitable electrical-to-optical converter. Suitable electrical-to-optical converters include appropriately doped and cut non-linear crystals such as LiNb03 crystals.

It is well known [D. Penninckx, *Effect of electrical filtering of duobinary signals on the chromatic dispersion transmission limitations*, Proc. ECOC'98, 537-538, 1998] that a D&A duobinary signal exhibits improved back-to-back performance, but is less dispersion tolerant than LP duobinary. However, the back-to-back performance—that is the performance when the dispersion is extremely low, such as over short distances or over transmission media that are very well dispersion compensated—is usually several dB worse than that of standard NRZ transmission for both D&A and LP duobinary signals, unless sophisticated over-sampling receivers are used [L. Moeller et al., *10-Gb/s duobinary receiver with a record sensitivity of 88 photons/bit*, Proc. OFC'04, paper PDP30, 2004].

For testing and specifying optical transmitters in data networks with long transmission lengths, it is desirable to have a single optical transmission system that is capable of both good back-to-back transmission and has good chromatic dispersion characteristics, such as a duobinary transmitter with good back-to-back performance. Furthermore, techniques often are applied to cancel chromatic dispersion in a transmission media, such as by inserting in the transmission path one or more dispersion compensating modules (DCMs) that introduce the opposite dispersion characteristics from those introduced in the transmission medium in order to cancel out the dispersion and produce a dispersion-free signal at the end. Of course, the goal of such DCMs is to reduce dispersion in the signal to zero, although this is rarely achieved. Generally, dispersion is reduced to a level such that a duobinary signal will have very good performance. However, designers are faced with the paradoxical problem in the case of duobinary signals of reducing performance if the DCMs happen to work very well and reduce dispersion so low that the performance of the system actually is reduced (since, as previously noted, duobinary signals actually start to exhibit worse performance as dispersion gets very low).

The method and apparatus of this invention provide a tunable delay and a method and apparatus for applying the delay to provide a single tunable duobinary transmitter that can be adjusted to have either good back-to-back performance or low chromatic dispersion. Indeed, in one embodiment, the present invention is a single duobinary transmitter capable of being tuned to approach both the dispersion tolerance of LP duobinary generation and the b-b performance of NRZ transmission. This is achieved, in part, by including a delay that is adjustable to be either slightly shorter or longer than one full bit period of the signal. This variable, fractional delay allows the temporal and spectral properties of the resulting duobinary signal to be adjusted to meet either the need for good back-to-back performance or to result in good dispersion tolerance. This allows a single transmitter to be either hardware- or software-configured so as to have optimal signal characteristics for a particular application.

FIG. 1 shows various components of an exemplary tunable optical transmitter 10 that can be utilized to implement the inventive concepts described herein. The optical transmitter includes a processor 16 having variable delay unit 18 and an adding unit 20. The optical transmitter also includes an electrical-to-optical converter 22 and a driver amplifier 28.

A pattern generator 12 provides a binary signal 14 containing encoded information that is received by the optical transmitter's processor 16. The binary signal 14 is split, with part of the signal being fed directly into adding or combiner circuit 20, while a copy of signal 14 is fed into a variable delay unit 18. (Alternately, the pattern generator could output two separate signals. Traditionally, delay-and-add duobinary is coded by delaying one copy of a signal by a single bit period of the signal, and combining that delayed copy with an un-delayed copy of the signal to form the duobinary three-level signal. There have also been proposals for creating other partial response signals (of which duobinary is a sub-class) by using delays that are equal to integer bit periods greater of than a single bit period. However, all such schemes involve delays that are fixed and are an integer multiple of the signal bit period. Delaying broadband signals by integer multiples of the signal bit period is well known in the art and relatively simple to implement by for instance, latched flip-flop gates or similar devices. Electronically tunable delays of digital broadband signals that are not integer multiples of the signal bit period are significantly more difficult to implement. An improved simple method of accomplishing delays of such fractional values of the signal bit period is disclosed in FIG. 3, described later, and is a significant component of the present invention and of implementing it practically.

The variable delay unit 18 incorporated in the optical duobinary apparatus set up in accordance with the present invention is capable of introducing into a copy of signal 14 a delay that is both tunable and may be equal to, greater than or less than a single bit period of a signal This delay by a variable amount may include delays that are integer bits periods of the signal and fractions of bit periods of the signal. The delayed signal 24 is fed into combiner circuit 20, where it is combined with un-delayed signal 14 and converted into an output that is a duobinary signal, representative of the binary signal 14. The duobinary signal or summed output 26 is fed into a suitable electrical amplifier 28 so as to be able to drive electrical-to-optical converter 22. Electrical-to-optical converter 22 is capable of converting the duobinary signal into an optical duobinary signal 30. Suitable electrical-to-optical converters 22 include, but are not limited to, well-known x-cut, y-propagating Lithium Niobate ($LiNbO_3$) substrate, as supplied by, for instance, Corning OTI, now a part of the Avanex Corporation of Fremont, Calif. A suitable driver amplifier 28 having the requisite current, voltage, output impedance and other characteristics for driving the electrical-to-optical converter 22 include the well-known SHF 107CP broadband amplifier as supplied by SHF Communications Technology AG of Berlin, Germany.

The variable delay unit 18 is typically capable of producing a delay of between 0.5 and 1.5 bit periods of the signal. A delay that is in the range of between 1.01 and 1.5 bit periods of the signal provides a duobinary signal that behaves in a similar fashion to a NRZ signal providing good back-to-back, or short transmission length behavior, with a delay on the order of 10% longer than a single bit period, i.e. about 1.1 bit periods, providing a duobinary signal with particularly good back-to-back performance. In one particular experiment, a delay of 1.127 was found to provide excellent back-to-back performance. A delay that is in the range of between 0.5 and 0.99 bit periods provides a duobinary signal similar to a LP-duobinary signal, having good dispersion behavior that is useful in long fiber transmission. A delay that is substantially 0.9 bit periods or of the order of 10% shorter than a single bit period of the signal provides a duobinary signal that is particularly good for long fiber transmission. In one particular experiment, excellent dispersion performance was achieved with a delay of 0.894.

Figure 2:
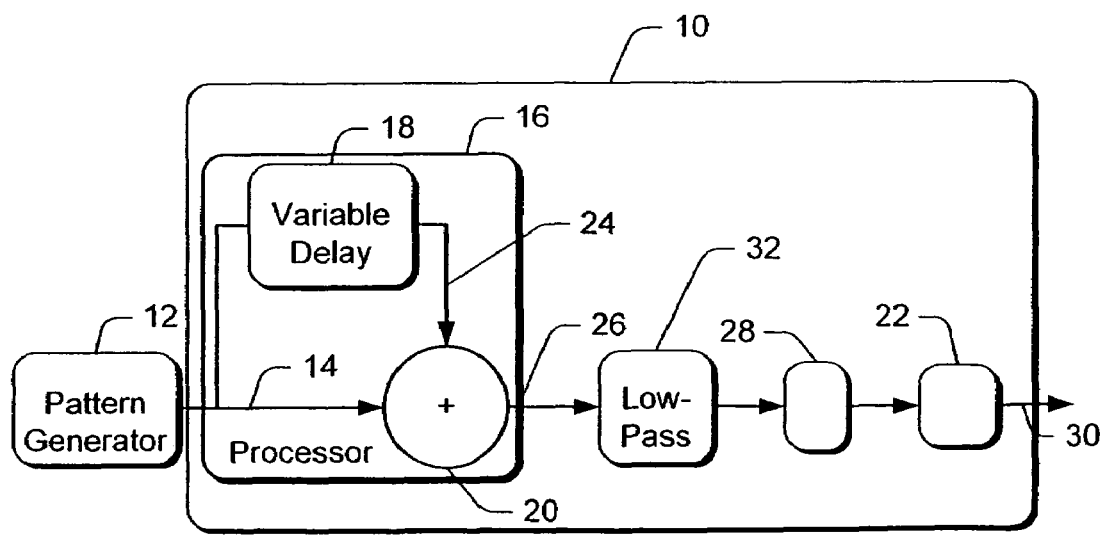
FIG. 2 is a schematic drawing of a further embodiment of an apparatus for producing an optical duobinary signal in accordance with the present invention.

FIG. 2 shows a tunable optical transmitter in accordance with a further embodiment the present invention. In addition to the elements included in the embodiment of FIG. 1, this further embodiment includes a low pass filter 32 for filtering the duobinary signal. A low pass filter 32 having a band pass limited to about 60% of the maximum bit rate of signal 14 is found to improve the dispersion response of the signal. For a 10.664 Gb/s signal, low-pass filter 36 would have a band pass limit of about 6 GHz to be effective.

Figure 3:
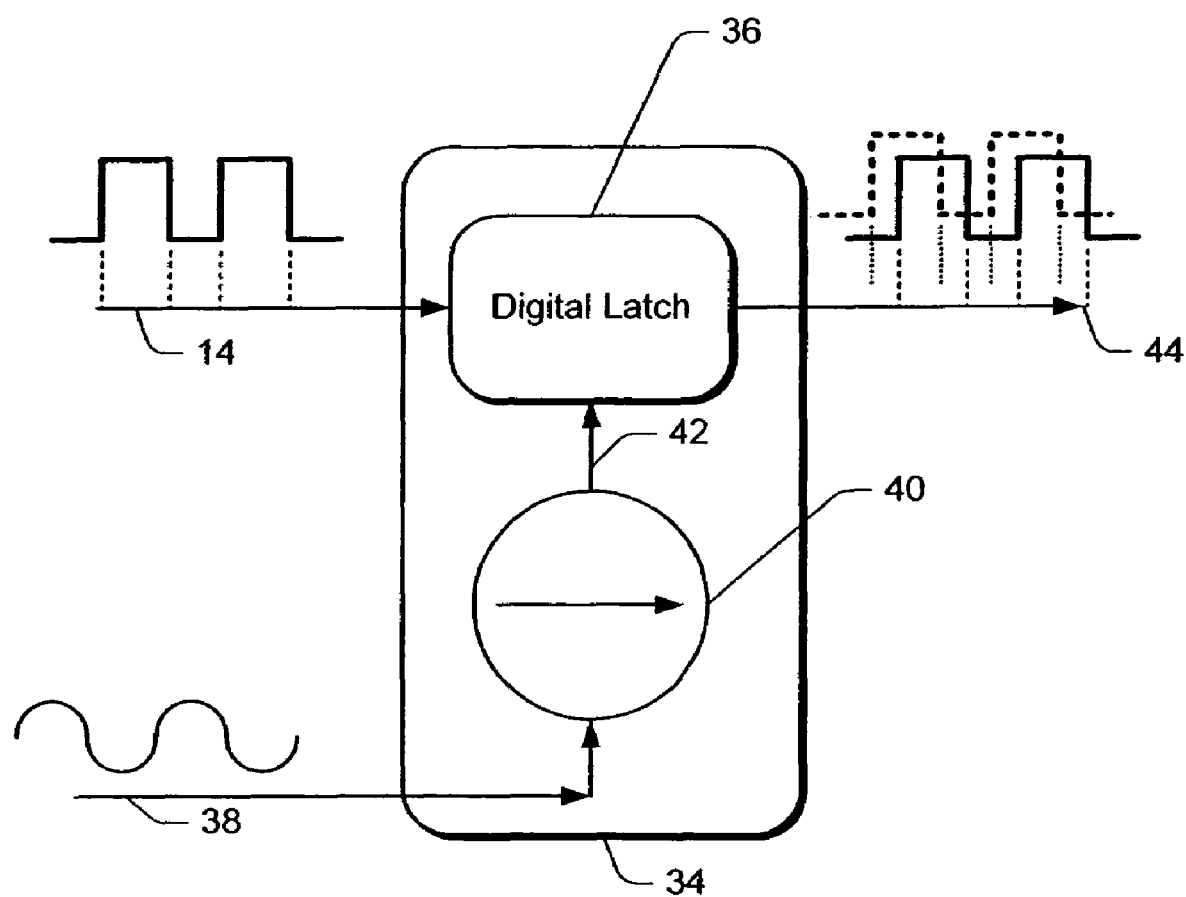
FIG. 3 is a schematic drawing of an apparatus for providing a variable delay to a wide-band digital signal in accordance with the present invention.

FIG. 3 shows a schematic drawing of an apparatus for providing a variable delay to a wide-band digital signal by phase shifting a narrow-band clock signal. While providing a fixed, integer-bit delay to a high-bandwidth digital signal is well known, providing a fractional-bit delay to such a high-bandwidth digital signal has hitherto been considered significantly more difficult. The circuit of FIG. 3 is a simple method of providing such a variable, fractional-bit delay to a high-bandwidth digital signal. In the variable delay circuit in accordance with the present invention, a broadband digital signal 14 is fed into a digital latching circuit 36. A narrow-band clocking signal 38 is fed into a narrowband phase shifter 40 before being fed as a variable phase clock input 42 to the digital latching circuit 36. Digital latching circuit 36 has latching circuits set to trigger at appropriate levels of variable phase clock signal 42. Clock signal 38 may be as simple as a pure sine or cosine signal or may have a single dominant fundamental frequency. Varying the phase of such signals that are a pure sine or cosine or have a single dominant fundamental frequency are well-known in the art and simple to implement. By having the fundamental frequency of the clock signal effectively match the bit rate of the broad band signal, and by having latching thresholds of the digital latching circuit 36 set to trigger close to a peak or a valley, the output signal 44 of the digital latching circuit 36 may be made to be effectively a synchronized replica of input broadband signal 14. By using narrowband phase shift circuit 40 to vary the phase of the clock signal 38, output signal 44 can be made to effectively be a phase shifted or time delayed replica of input signal 14. Variable delay unit 18 may be constructed by combining the broad-band variable delay circuit 34 of FIG. 3 with a well-known integer bit delay circuit.

Figure 4:
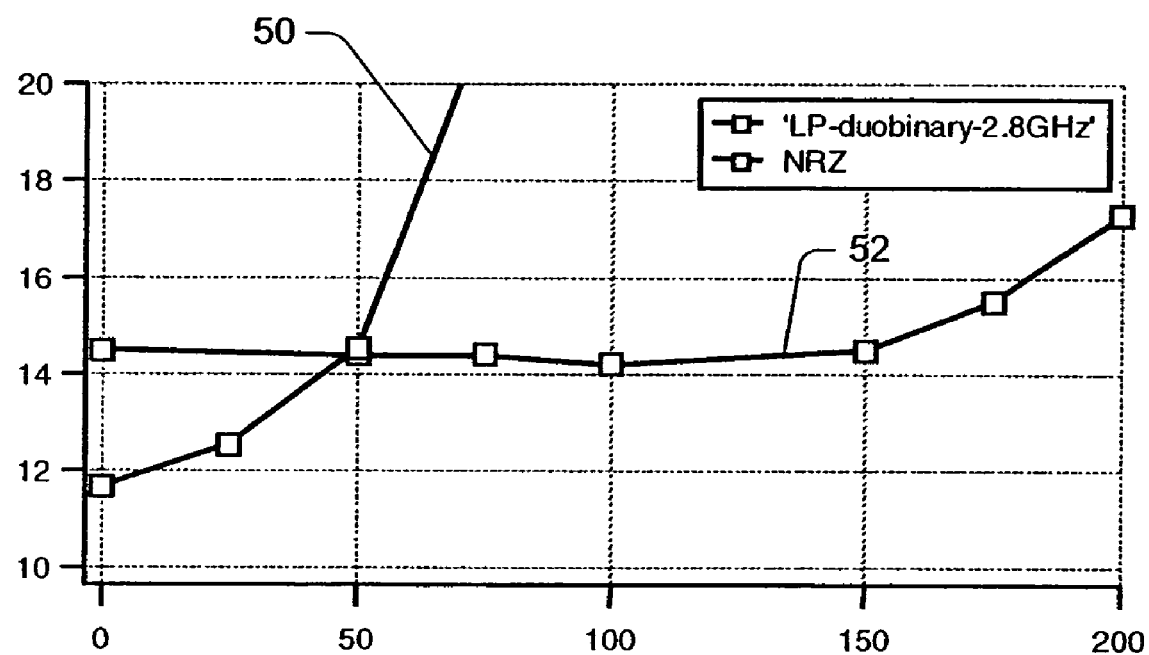
FIG. 4 is a graph comparing the measured performance of a Non-Return to Zero (NRZ) encoded transmission with Duobinary generated by pure Low Pass (LP) filtering (without delay-and-add circuitry).

FIG. 4 is a graph comparing the performance of a Non-Return to Zero (NRZ) encoded transmission with Duobinary encoded by Low Pass (LP) filtering transmission. The vertical axis of the graph indicates the required Signal to Noise Ratio (SNR) of the optical signal in decibels (dB). The lower this value, the better. FIG. 4 shows how a Non-Return-to Zero (NRZ) or binary, coded signal 50 performs very well over short distances of fiber, referred to in the art as having good back-to-back performance. However, the NRZ signal 50 performance degrades rapidly with fiber length, due to dispersion in the fiber. A low pass (LP) duobinary coded signal 52 shows significantly better performance at long fiber lengths but has worse back-to-back performance than NRZ coded signal.

Figure 5:
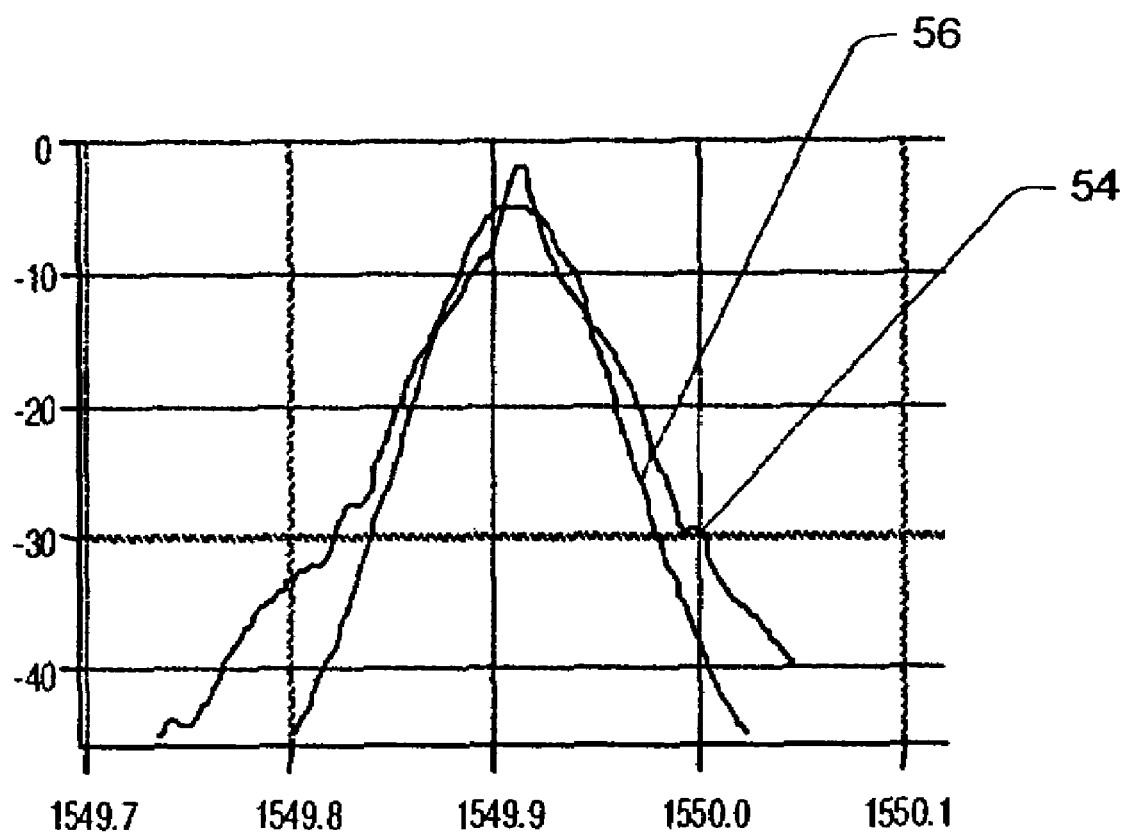
FIG. 5 is a graphical comparison on the measured spectrum of a Non-Return to Zero (NRZ) encoded transmission with the spectrum of a Duobinary generated by pure Low Pass (LP) filtering (without delay-and-add circuitry).

FIG. 5 is a graphical comparison on the spectrum of a Non-Return to Zero (NRZ) encoded transmission with the spectrum of a Duobinary encoded by Low Pass (LP) filtering transmission. FIG. 5 shows spectra for a NRZ signal 54 and for a LP-duobinary signal 56. The narrow spectral width of the LP-duobinary signal accounts for the lower dispersion in the fiber.

Figure 6A:
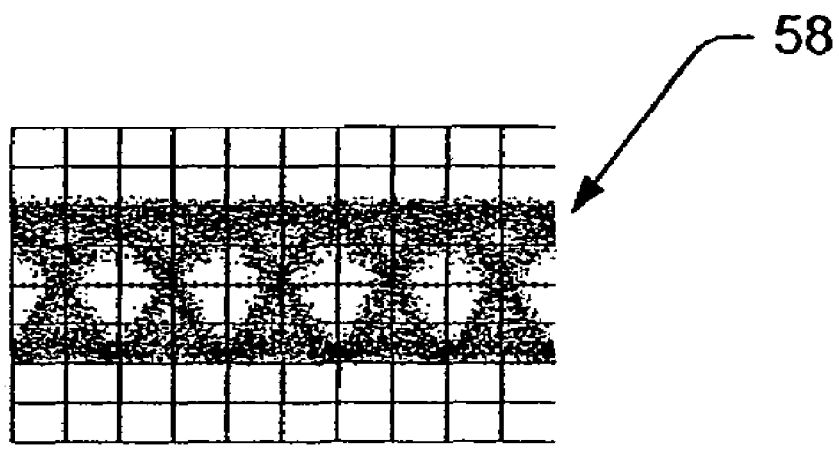
FIG. 6a is an "Eye Diagram" oscilloscope display of a signal that has been Duobinary encoded by Low Pass (LP) filtering.

FIG. 6a is an "Eye Diagram" oscilloscope display of a signal that has been Duobinary encoded by Low Pass (LP) filtering. The "eye" 58 of the LP-duobinary coded signal has a significant "V" shape, which is an indicator that the signal will have poor back-to-back performance.

Figure 6B:
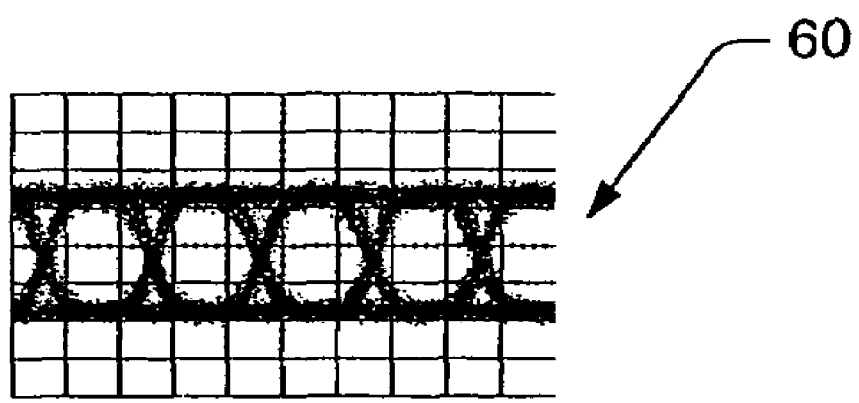
FIG. 6b is an "Eye Diagram" oscilloscope display of a signal that has been a Non-Return to Zero (NRZ) encoded.

FIG. 6b is an "Eye Diagram" oscilloscope display of a signal that has been a Non-Return to Zero (NRZ) encoded. The "eye" 60 of the NRZ coded signal has a significant "U" shape, which is an indicator that the signal will have good back-to-back behavior.

FIG. 7a is an "Eye Diagram" oscilloscope display of a signal that has been Duobinary encoded by Delay and Add processing in which the delay is greater than one bit duration of the signal. The "eye" 62 of the add and delay duobinary signal with a delay that is approximately 12% longer than a single bit, i.e. 106 ps for a 94 ps bit signal, has a significantly-visible "U" shape. This is an indicator that with a slightly longer than 1 bit delay, the signal will behave in a similar fashion to a NRZ signal and have good back-to-back behavior.

FIG. 7b is an "Eye Diagram" oscilloscope display of a signal that has been Duobinary encoded by Delay and Add processing in which the delay is equal to one bit duration of the signal.

FIG. 7c is an "Eye Diagram" oscilloscope display of a signal that has been Duobinary encoded by Delay and Add processing in which the delay is less than one bit duration of the signal. The "eye" 66 of the add and delay duobinary signal with a delay that is approximately 11% shorter than a single bit, i.e. 84 ps for a 94 ps bit signal, has a significantly-visible "V" shape. This is an indicator that with a slightly shorter than 1 bit delay, the signal will behave in a similar fashion to a LP-duobinary signal and have good dispersion behavior and be more useful in long fiber transmission FIG. 8 is a graph comparing the measured performance of transmissions having been encoded in Non-Return to Zero (NRZ) format 50, Duobinary format by Low Pass (LP) filtering 52, Duobinary format by Add and one-bit delay 68 and Duobinary format by Add and optimized, non-integer bit, tunable delay 70.

In the optimized, non-integer bit, tunable delay 70, the delay is made longer than one bit for short cable or back-to-back situations. As can be seen from the graph, the back-to-back performance of the variable delay duobinary signal 70 can be made significantly better than both LP-duobinary 52 and one-bit add and delay duobinary signal 68, and while not quite as good as NRZ signal 50, it approaches it.

Figure 8:
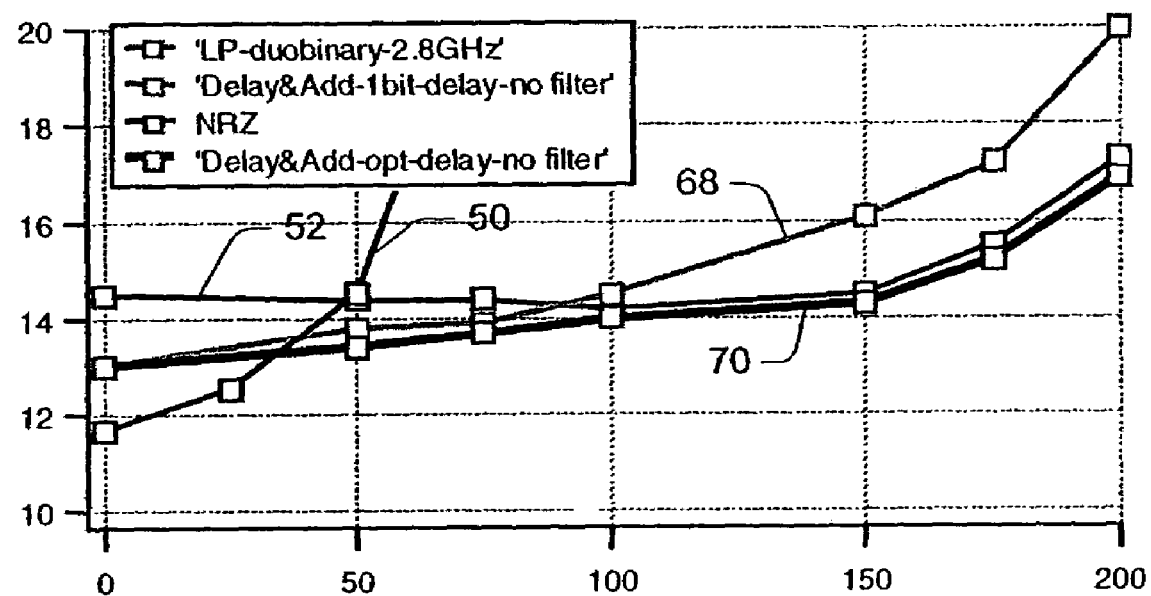
FIG. 8 is a graph comparing the measured performance of transmissions having been encoded in Non-Return to Zero (NRZ) format, Duobinary format by Low Pass (LP) filtering, Duobinary format by Add and one-bit delay and Duobinary format by Add and optimized, non-integer bit, tunable delay.

The graph in FIG. 8 also shows that by making the variable delay less than one bit, the optimized variable bit delay duobinary 70 has better dispersion performance than either LP-duobinary 52 or one-bit add and delay duobinary signal 68, and is significantly better than NRZ signal 50.

FIG. 8 shows that by tuning the delay, a duobinary transmitter can have either good back-to-back performance or good dispersion performance.

Figure 9:
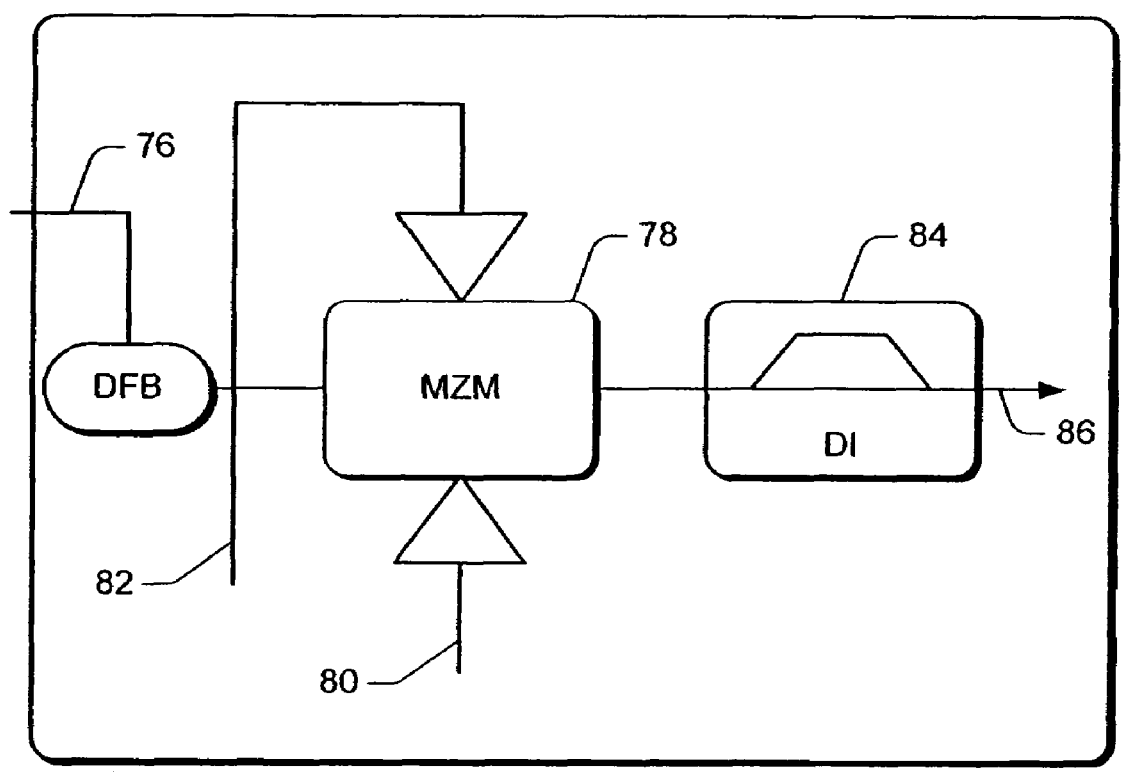
FIG. 9 is a schematic drawing of a further embodiment of an apparatus for producing an optical duobinary signal in accordance with the present invention.

FIG. 9 shows various components of an exemplarily further embodiment that can be utilized to implement the inventive concepts described herein, in which the delay that produces the duobinary signal is produced optically. The tunably delayed signal with transmitter application of FIG. 9 includes a Distributed Feedback Laser (DFB) 76, a dual drive Mach-Zehnder Modulator (MZM) 78, a binary data stream 80, a differentially coded version of the binary data stream 82, a Delay Interferometer (DI) 84 and an output optical signal 86. The MZM 78 may be biased at zero transmission. The DI 84 may be a passive integrated optics version. The differentially coded version of the binary data stream 82 exhibits a level change for every "1" bit of the signal.

In an exemplary optical delay embodiment of the present invention, a 1552.5 nm DFB laser 76 is switched between "1" and "0" using a MZM 78 biased at zero transmission. A 40 Gb/s electrical Non-Return-to-Zero (NRZ) driving signal 82 is a binary, differentially encoded version of the binary data stream 80. The MZM is followed by DI 84, which allows a delayed version of the MZM to interfere with a delayed version of itself, thereby producing a duobinary like optical signal 86.

Figure 10:
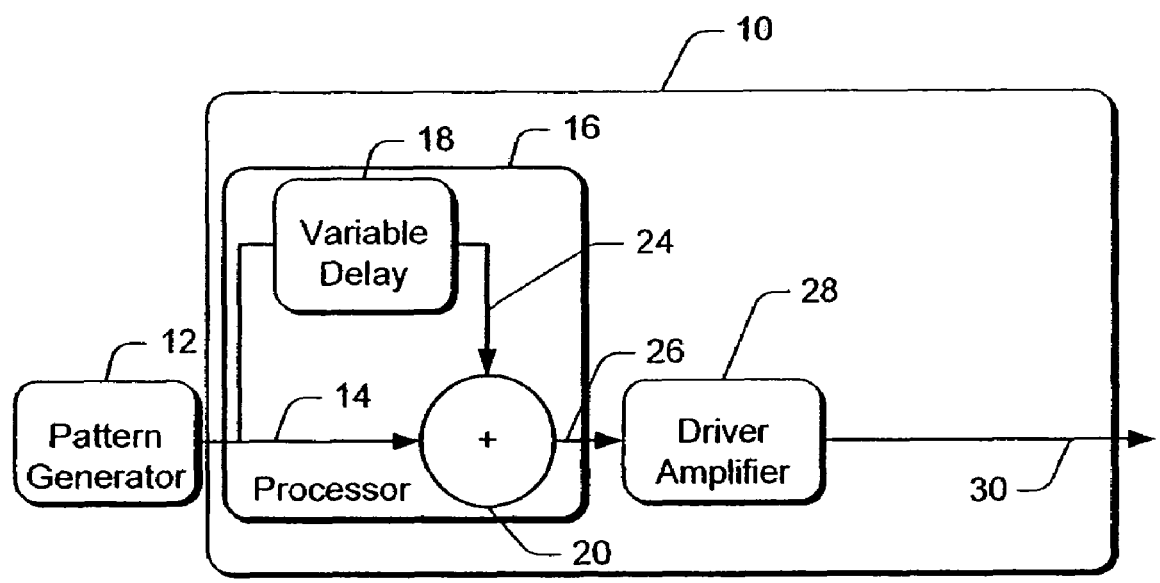
FIG. 10 is a schematic drawing of an apparatus for producing an electrical duobinary signal, in accordance with the present invention.

Although particularly suitable for use in connection with optical duobinary signal transmission, the invention has application to purely electrical transmission systems. A system may comprise essentially the same components as any of the systems illustrated in FIGS. 1, 2, and 3, except for the electrical-to-optical converter 22. In some embodiments, the driver 28 also may not be required. FIG. 10 is a block diagram of one transmitter that is similar to the system shown in FIG. 1, but in which signal transmission is purely in the electrical domain. The transmitter includes a processor 16 having variable delay unit 18 and an adding unit 20. The transmitter also includes an optional electrical driver amplifier 28.

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method for matching a transmission characteristic of a duobinary signal to a transmission requirement, the method comprising:
    delaying a copy of a binary signal by an amount of time equal to a non-integer multiple of a signal bit period of the binary signal; and
    producing the duobinary signal by combining the delayed copy of the binary signal with the binary signal.

2. The method as recited in claim 1, wherein the duobinary signal is an electrical signal.

3. The method as recited in claim 2 further comprising converting the duobinary signal into an optical signal.

4. The method as recited in claim 1, wherein delaying the copy of the binary signal further comprises introducing a delay of approximately between 1.01 and 1.5 times the bit period of the binary signal.

5. The method as recited in claim 1, wherein delaying the copy of the binary signal further comprises introducing a delay that is approximately 1.1 times the bit period of the binary signal.

6. The method as recited in claim 1, wherein delaying the copy of the binary signal further comprises introducing a delay that is approximately between 0.5 and 0.99 times the bit period of the binary signal.

7. The method as recited in claim 1, wherein delaying the copy of the binary signal further comprises introducing a delay that is approximately 0.9 times the bit period of the binary signal.

8. The method as recited in claim 1, wherein delaying the copy of the binary signal further comprises introducing a delay longer than one bit period of the binary signal, selected to provide improved back-to-back performance.

9. The method as recited in claim 1, wherein delaying the copy of the binary signal further comprises introducing a delay shorter than one bit period of the binary signal, selected to provide improved dispersion performance.

10. The method as recited in claim 1, wherein delaying the copy of the binary signal further comprises:
    providing the binary signal to a digital latching circuit;
    applying a narrow band clocking signal to the digital latching circuit; and,
    phase shifting the narrow band clocking signal to produce the delayed copy of the binary signal.

11. An apparatus for matching a transmission characteristic of a duobinary signal to a transmission requirement, comprising:
    an input latch configured to receive a binary signal; and
    a processor configured to: (i) delay a copy of the binary signal by an amount of time equal to a non-integer multiple of a signal bit period of the binary signal, and (ii) produce the duobinary signal representative of the binary signal by combining the delayed copy of the binary signal with the binary signal.

12. The apparatus as recited in claim 11, wherein the duobinary signal is an electrical signal.

13. The apparatus as recited in claim 12 further comprising an optical converter coupled to receive the duobinary signal and convert the duobinary signal into an optical duobinary signal.

14. The apparatus of as recited in claim 11, wherein the delay is approximately between 1.01 and 1.5 times the bit period of the binary signal.

15. The apparatus as recited in claim 11, wherein the delay that is approximately between 0.5 and 0.99 times the bit period of the binary signal.

16. The apparatus as recited in claim 11, wherein the input latch is a digital latching circuit controlled by a phase-shifted narrow-band clocking-signal to produce the delayed copy of the binary signal.

17. The apparatus as recited in claim 11, further comprising a low pass filter capable of filtering the duobinary signal.

18. The apparatus as recited in claim 11, wherein the delay is longer than one bit period of the binary signal and is selected to provide improved back-to-back performance.

19. The apparatus as recited in claim 11, wherein the delay is shorter than one bit period of the binary signal and is selected to provide improved dispersion performance.

20. The apparatus of claim 11, wherein the duobinary signal is an electrical signal; and further comprising an optical converter coupled to receive the duobinary signal and convert the duobinary signal into an optical signal.

21. An apparatus for delaying a broadband digital binary signal, comprising:
- a phase shift circuit coupled to receive a narrow band clock signal and adapted to output a phase shifted version of the narrow band clock signal; and
- a digital latching circuit configured to receive the broadband digital binary signal and the phase shifted version of the narrow band clock signal output by the phase shift circuit and to generate a phase shifted version of the broadband digital binary signal under control of the phase shift circuit.

* * * * *